United States Patent
Sato et al.

(10) Patent No.: US 7,357,996 B2
(45) Date of Patent: Apr. 15, 2008

(54) MAGNETIC RECORDING MEDIUM, MAGNETIC RECORDING DEVICE, AND METHOD OF MANUFACTURING MAGNETIC RECORDING MEDIUM

(75) Inventors: Junichi Sato, Nara (JP); Hiroshi Fuji, Soraku-gun (JP); Kunio Kojima, Nabari (JP)

(73) Assignee: Sharp Kabushiki Kaisha, Osaka (JP)

( * ) Notice: Subject to any disclaimer, the term of this patent is extended or adjusted under 35 U.S.C. 154(b) by 591 days.

(21) Appl. No.: 10/738,015

(22) Filed: Dec. 16, 2003

(65) Prior Publication Data
US 2004/0131893 A1   Jul. 8, 2004

(30) Foreign Application Priority Data
Dec. 25, 2002   (JP)   ............... 2002-375663

(51) Int. Cl.
*G11B 5/66* (2006.01)
*G11B 5/70* (2006.01)
(52) U.S. Cl. ...................... 428/832; 428/823
(58) Field of Classification Search ............... 428/823, 428/832, 846.2, 848.9, 821, 823.2; 369/13.38, 369/13.5
See application file for complete search history.

(56) References Cited

U.S. PATENT DOCUMENTS 5,656,385 A    8/1997  Nakajima et al. ........... 428/694
6,143,436 A    11/2000 Nakajima et al. ........... 428/694
6,898,158 B2 * 5/2005  Matsumoto ............. 369/13.38
2001/0000483 A1 * 4/2001 Tamanoi et al. ..... 428/694 ML
2002/0186506 A1  12/2002 Sato et al. .................. 360/135

FOREIGN PATENT DOCUMENTS

JP   2000-315310   11/2000

\* cited by examiner

*Primary Examiner*—Holly Rickman
(74) *Attorney, Agent, or Firm*—Peter J. Manus; David G. Conlin; Edwards Angell Palmer & Dodge LLP

(57) ABSTRACT

To suppress a magnetic wall movement in the structure including an amorphous magnetic layer as a recording layer, and to realize a high density recording with a sufficient signal quality level, a magnetic recording medium includes an amorphous magnetic layer (recording layer) formed on a substrate, a non-magnetic metal element layer (underlayer) formed between the substrate and the amorphous magnetic layer, wherein an average surface roughness Ra of the non-magnetic metal element layer is in a range of 0.7 nm to 2.0 nm. The foregoing structure having the non-magnetic metal element layer of a large average surface roughness Ra brings about a great pinning effect onto the amorphous magnetic layer, thereby forming magnetic bits under stable conditions when carrying out a high density recording.

26 Claims, 6 Drawing Sheets

MAGNETIC RECORDING MEDIUM, MAGNETIC RECORDING DEVICE, AND METHOD OF MANUFACTURING MAGNETIC RECORDING MEDIUM

This Nonprovisional application claims priority under 35 U.S.C. § 119(a) on Patent Application No. 2002/375663 filed in Japan on Dec. 25, 2002, the entire contents of which are hereby incorporated by reference.

FIELD OF THE INVENTION

The present invention relates to a magnetic recording medium and a magnetic recording device for magnetically recording information in a recording area of an amorphous magnetic layer, which serves as a recording layer, and also relates to a method of manufacturing the magnetic recording medium.

BACKGROUND OF THE INVENTION

In recent years, with remarkable development in technologies, recording intensities are increasing rapidly for optical memory devices represented by Blu-ray Disks (BDs), magneto-optical disks, etc., and magnetic memory devices represented by hard disks, etc. As an example of high-density magnetic recording/reproducing techniques, a heat assisted magnetic recording/reproducing method is known. Japanese Laid-Open patent Japanese Unexamined Patent Publication No. 4-176034/1992 (Tokukaihei 4-176034, published on Jun. 23, 1992) discloses an example of such heat assisted magnetic recording/reproducing method. This publication discloses a magnetic recording medium adopting a magnetic layer made of an N-type ferrimagnetic material having a compensation temperature (magnetic compensation temperature) at around room temperature, and also discloses the heat assisted magnetic recording/reproducing method for recording and reproducing on and from such magnetic recording medium using a laser beam (hereinafter referred to as the first prior art technique).

In the foregoing heat assisted magnetic recording/reproducing method, a recording operation is performed by heating a recording area of the magnetic recording medium with an application of a laser beam to reduce a coercivity of the recording area to a sufficiently low level, and information is then recorded in the recording area with an application of an external magnetic field by a recording magnetic head. In this recording method, the recording bit (recording marks) forming area is limited to an area where a laser beam application area and a magnetic field application area are overlapped.

The positional relationship of these areas will be explained in reference to FIG. 6. As illustrated in FIG. 6, a recording area 63 is an area where a) an area 61 having applied thereto a magnetic field by a magnetic head and b) a heated area (an area corresponding to a light spot) 62 with an application of a laser beam are overlapped, and recording bits are formed in the recording area 63. With this structure, it is possible to record a track 64 of the same width as a laser beam spot diameter yet smaller than the width of the magnetic field application area 61 (diameter of the heated area 62: 0.5 μm or smaller) on the magnetic recording medium by a magnetic recording head having a width of few μm (which is the same width as that of a conventional magnetic recording head).

When reproducing, information are reproduced from a reproducing area of the magnetic recording medium, which is heated with an application of a laser beam to increase an intensity of a residual magnetization. Here, the reproducing area is also limited to the area where the laser application area and the reproducing head area are overlapped. With this structure, it is possible to reproduce tracks recorded at a small track pitch while suppressing crosstalk.

As described, in order to realize a high density recording/reproducing, the heat assisted magnetic recording/reproducing method of the first prior art technique is characterized by reducing the recording track width while suppressing crosstalk by selectively heating a area smaller than the magnetic field application area using a laser beam as a light source.

In the above magnetic recording medium adopted in the foregoing heat assisted magnetic recording/reproducing method, an underlayer is not formed on a disk substrate, or an aluminum nitride (AlN) layer is formed on the disk substrate as an underlayer in a thickness of 60 nm, and the magnetic layer or the protective layer are formed on the disk substrate or the AlN underlayer in this order. Here, the AlN underlayer serves to improve an absorption ratio of light incident on the magnetic recording medium (i.e., the ratio of the light absorbed in the magnetic layer), which, in turn, increases the recording density.

Japanese Laid-Open patent Japanese Unexamined Patent Publication No. 315310/2000 (Tokukai 2000-315310, published on Nov. 14, 2000) discloses a technique which realize a high density recording utilizing the pinning effect by adopting NiP as a material for the underlayer, which serves to increase Ra on the surface of the underlayer (hereinafter referred to as a second prior art technique).

The pinning effect indicates such effect of hindering of motion of dislocations of a magnetic wall in a magnetic material by locally introducing therein impurities or defects, resulting in a large energy barrier being imposed against the motion of the dislocations of the magnetic wall. Here, the impurities, defects, etc., thus locally introduced are called "Pinning Site".

In the information recording medium, the more the minimum recording bit length (the minimum recording bit length corresponding to 1 bit information in the track direction, as denoted by "M" in FIG. 6) is reduced by increasing a recording frequency (magnetic field application frequency in the magnetic field modulation method), the more the recording density can be increased.

However, in the foregoing heat assisted magnetic recording method of the first prior art technique, the magnetic recording medium adopted in the method does not provide sufficient level of recording/reproducing performances, and it is therefore difficult to form a recording bit with a minimum recording bit length of 200 nm or smaller. As a result, possible improvements in recording density are limited as is clear from the following phenomenon.

Namely, evaluation results of the recording/reproducing performances of the magnetic recording medium adopted in the above publication show that a signal quality deteriorates sharply when the minimum recording bit length is set to around 200 or less.

Further, the recording bits formed on the magnetic recording medium are observed by a Magnetic Force Microscope (MFM). The observation results show such phenomenon of respective recording bits being disturbed as being attracted to each other, or some of them being disappeared, etc., appear when the minimum recording bit length is reduced almost to 200 nm. The foregoing phenomenon can be recognized as a reduction in a track width, and the phenomenon then indicates that the track width is reduced gradually and will be interrupted eventually.

In view of the foregoing, for the conventional magnetic recording medium, a minimum recording bit length for practical use cannot be reduced further from 250 nm to ensure the reliability in its application of the heat assisted magnetic recording device.

The exchange interaction can be one of the reasons which make the recording bit shape unstable in the conventional magnetic recording medium, as will be explained below.

The smaller is a recording bit, the greater is the effect of the exchange interaction on the recording bit. Specifically, in the case of adopting the magnetic layer made of an N-type ferrimagnetic material having a compensation point at around room temperature such as a TbFeCo magnetic material, etc., the exchange interaction is exerted in the direction of aligning the magnetic direction of adjacent recording bits in one direction. In particular, in the heat assisted recording/reproducing method in which the recording area is heated, the magnetic anisotropy (coercive force in the recording/reproducing area is reduced significantly when recording, and the effect on the exchange interaction on the recording bit out of the total effects becomes larger. Therefore, when forming smaller recording bits, due to the effects of magnetizations in the surrounding, the magnetic wall is liable to dislocate, and the stable shape of the recording bits cannot be ensured. Therefore, with the foregoing first conventional technique, in order to form the recording bits with a length of not more than 200 nm, any means for suppressing the magnetic wall dislocations is necessary.

On the other hand, in the second prior art technique, a nickel phosphorus (NiP) layer is adopted as a base layer to realize high density recording. As a result, protrusions and recessions are formed on the surface of the underlayer, which serve as the pinning site, thereby realizing a high density recording.

However, NiP has a low layer separation temperature of around 350° C. (temperature at which NiP is separated into Ni and P). Therefore, when heating with an application of a laser beam in the optical assisted recording/reproducing area, not only the problem of the deformation of the recording bits but also the problem of the NiP layer separation are liable to occur. As a result, Ni deposition occurs randomly in the recording/reproducing area, which causes the deformation of the soft magnetic material. Furthermore, the deformation of the recording bits is irreversible, and does not accord with the position or shape of the magnetic bits of the magnetic layer. Therefore, such deformation can be a cause of generating noise in reproducing signals. For the reasons set for above, the NiP layer is not suited for the optical assisted recording/reproducing method.

SUMMARY OF THE INVENTION

The present invention is achieved in finding a way to solve the foregoing problems, and it is therefore an object of the present invention to provide a magnetic recording medium which permits a magnetic wall movement to be suppressed appropriately with the structure including the amorphous magnetic layer as the recording layer, and which permits a high density recording to be performed with a sufficiently high signal quality level, a magnetic recording device and a method of manufacturing the magnetic recording medium.

In order to achieve the foregoing object, the magnetic recording medium of the present invention is characterized by including:

a substrate;

an amorphous magnetic layer formed on said substrate, the amorphous magnetic layer serving as a recording layer; and a non-magnetic metal element layer formed between said substrate and said amorphous magnetic metal element layer, wherein an average surface roughness Ra of said non-magnetic metal element layer is in a range of 0.7 nm to 2.0 nm.

The foregoing structure of the magnetic recording medium of the present invention including the amorphous magnetic layer made of, for example, TbFeCo, as the recording layer offers the following effects.

The magnetic layer can be manufactured at room temperatures in a simple manner (when adopting crystals, a high temperature process at few hundreds ° C. is needed). Incidentally, since TbFeCo of any composition can be adopted, it is possible to control characteristics (composition) successively (for crystals, applicable compositions are limited). Furthermore, the size of the magnetic bits are not restricted by the size of the crystal grains, and therefore it is possible to form fine bits (for crystals, the size of the bits is larger than the crystal grains).

For the magnetic recording medium adopting the amorphous magnetic layer which serves as the recording layer, the problem of unstable shape of the recording bits becomes more outstanding.

In the magnetic recording medium wherein a polycrystalline magnetic material (Co alloy magnetic material, for example) is adopted for the magnetic layer, recording bits are separated by a crystalline grain field. In contrast, according to the magnetic recording medium of the present invention adopting the amorphous magnetic layer made of an amorphous magnetic material, a crystal grain field does not exist, and thus, magnetically, recording bits are formed successively over the entire surface of the medium without being separated by the crystalline grain field. Namely, exchange interaction exerted among the recording bits is relatively large, and factors of hindering a magnetic wall movement are small.

For the magnetic recording medium adopting the magnetic layer made of the amorphous magnetic material, it is still more important to suppress the magnetic movement of the magnetic layer.

According to the magnetic recording medium of the present invention, the non-magnetic metal-element layer has an average surface roughness Ra in a range of 0.7 nm to 2.0 nm. The foregoing structure having the non-magnetic metal-element layer of a large average surface roughness Ra brings about a great pinning effect onto the amorphous magnetic layer, thereby forming magnetic bits under stable conditions when carrying out a high density recording.

The non-magnetic metal element layer which serves as the underlayer of the amorphous magnetic layer is made of a non-magnetic metal. Therefore, such problem associated with the conventional structure adopting the underlayer including magnetic metal (second prior art technique), i.e., the magnetic material being deposited due to a rise in temperatures can be prevented.

For a fuller understanding of the nature and advantages of the invention, reference should be made to the ensuing detailed description taken in conjunction with the accompanying drawings.

DESCRIPTION OF THE EMBODIMENTS

The following descriptions will explain one embodiment of the present invention in reference to figures.

Figure 1:
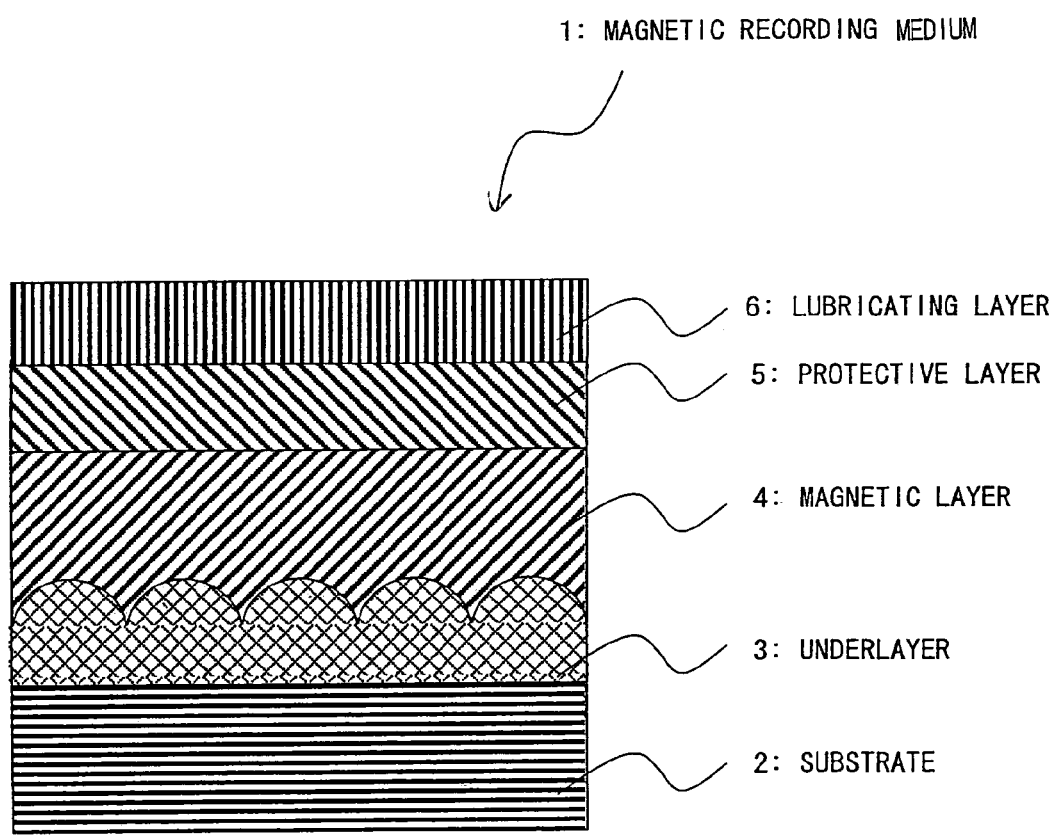
FIG. 1 is a longitudinal cross-sectional view showing a magnetic recording medium in accordance with one embodiment of the present invention.

FIG. 1 is a longitudinal cross-sectional view of a magnetic recording medium 1 in accordance with the present embodiment. This magnetic recording medium 1 adopts a heat assisted magnetic recording/reproducing method for magnetically recording/reproducing information in a recording area by heating with an application of a laser beam.

As illustrated in FIG. 1, the magnetic recording medium 1 includes a substrate 2 having formed thereon an underlayer (non-magnetic metal element layer) 3 made of a non-magnetic metal element, an amorphous magnetic layer (magnetic layer) 4 made of an amorphous magnetic material, a protective layer 5 and a lubricating layer 6 which are laminated in this order.

The material for the substrate 2 is not particularly limited as long as its surface on the side of the amorphous magnetic layer 4 can be made substantially flat. For example, a glass substrate, aluminum (Al) substrate, a plastic substrate, a silicon substrate, etc., may be adopted for the substrate 2. Among the foregoing non-limited examples, the glass substrate is especially preferable. It is also preferable that the substrate 2 has an average surface roughness (Ra) smaller than 1 nm on the side of the underlayer 3 so as to make the protrusions and recessions on the magnetic recording medium 1 fully noticeable. Incidentally, the smaller the average surface roughness is, the more it is desirable.

The underlayer 3 serves as the base for forming protrusions and recessions on the surface of the amorphous magnetic layer 4 that is to be laminated on the underlayer 3. For this purpose, it is preferable that the underlayer 3 be made of non-magnetic metal as fine protrusions and recessions are formed on its surface when formed on the substrate 2. Among non-magnetic metals, those having relatively low melting points are suited for the underlayer 3 as fine protrusions and recessions are formed as grains when forming the underlayer 3.

Here, it is preferable that the purity of a non-magnetic material (non-magnetic metal, for example) for use in the underlayer 3 be not less than 99.9%. The higher the purity of the non-magnetic material is, the more the crystallization of the underlayer 3 is expedited, and the protrusions and recessions with a larger average surface roughness Ra can be formed on the underlayer 3.

For the non-magnetic metal as the material (raw material) of the underlayer 3, aluminum (Al), argentums (Ag), zinc (Zn) or magnesium (Mg) may be adopted. For example, by forming an Al layer as the underlayer 3 with an average thickness in a range of 1 nm to 5 nm, fine protrusions and recessions (with a diameter of the fine protrusions and recessions of 10 nm to 45 nm) can be formed with ease. The shape of the surface of the underlayer 3, i.e., the shape of the protrusions and recessions, is affected by the purity of the material (raw material) to a great extent. Here, the higher the purity is, the larger the Ra on the surface of the underlayer is.

In the specification of the present application, "the average layer thickness" indicates the thickness of the layer obtained in the following indirect manner. Firstly, a layer made of the same material as the material of the layer as an object of the measurement is formed under the same conditions as the object layer forming conditions to be thick enough to ignore the protrusions and recessions on the surface of the layer with respect to the layer thickness, and the resulting test sample is used as a sample. Next, the thickness of the test sample is measured, and the rate of forming the layer is calculated based on the thickness of the layer as measured and the film forming time. Then, the thickness of the target layer, i.e., the average layer thickness is obtained based on the rate of forming the layer thus obtained. This average layer thickness may be recognized as a layer thickness as obtained by converting a mass of the layer into a layer thickness according to density.

For the amorphous magnetic material of the amorphous magnetic layer 4, any magnetic material that permits heat assisted magnetic recording, i.e., ferrimagnetic materials having compensation temperature in a vicinity of room temperature may be adopted. For such ferrimagnetic materials, amorphous rare earth-transition metal alloy is preferable. Examples of such amorphous rare earth-transition metal alloy include TaFe, GdFe, DyFeCo and TbFeCo, and TbFeCo is particularly preferable. In this specification, an alloy indicated, for example, by "TbFe" indicate TbFe alloy of any composition ratio without specifying any particular composition ratio.

The protective layer 5 is provided for protecting the amorphous magnetic layer 4 from being scratched by a contact with the magnetic head. The material for the protective layer 5 is not particularly limited. Examples of such protective layer 5 are not particularly limited, and for example, a carbon series protective layer such as a carbon layer, a carbon nitride layer, etc., may be adopted. Among non-limited examples, the carbon layer is especially preferable.

The lubricating layer 6 is provided for preventing friction generated by a contact with the magnetic head. For the lubricating layer 6, fluorine lubricant, especially perfluoropolyoxy-alkane (perfluoropolyether) lubricant is preferable.

In the above, explanations have been given through the case of adopting the heat assisted magnetic recording magnetic recording medium as the magnetic recording medium 1. However, the magneto-optical recording medium 1 of the present embodiment is not limited to the above, and a magnetic recording medium for magnetically recording in other system, such as a magnetic recording medium for recording thereon magnetically with an application of a magnetic field may be adopted.

Next, a magnetic recording/reproducing device (magnetic recording device) using the foregoing magnetic recording medium 1 will be explained.

Figure 2:
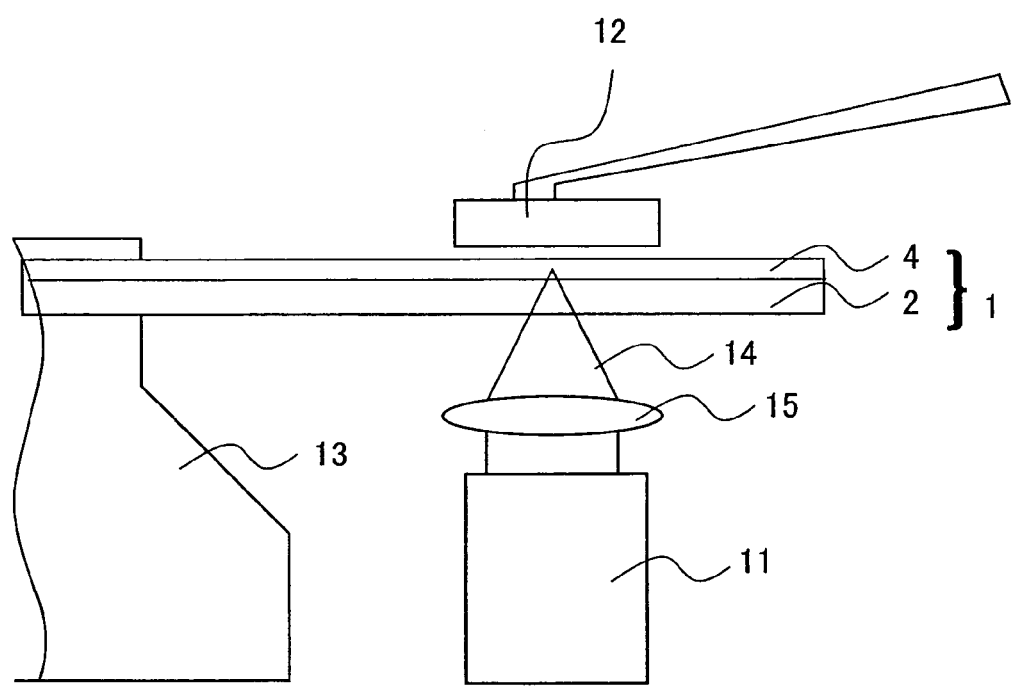
FIG. 2 is a typical depiction schematically showing a magnetic recording device in accordance with one embodiment of the present invention.

As illustrated in FIG. 2, the magnetic recording/reproducing device in accordance with the present embodiment includes a laser pickup (light projection means, optical head) 11 for heat assist, a magnetic head (magnetic field application means) 12, and a motor 13 for rotating the magnetic recording medium 1 and an objective lens 15.

The laser pickup 11 includes a laser light source (not shown). This laser light source emits a light beam (laser beam) 14 for locally heating the amorphous magnetic layer 4. The laser beam 14 is emitted onto the amorphous magnetic layer 4 through the underlayer 3 from the side of the substrate 2 of the magnetic recording medium. An objective lens 15 is provided for focusing the light beam 14 emitted from the laser light source onto the amorphous magnetic layer 4.

The magnetic head 12 is provided on the opposite side of the laser pickup 11 with respect to the magnetic recording medium 1. The magnetic head 12 applies a magnetic field onto at least a part of the area of the amorphous magnetic layer 14, as irradiated with the optical beam 14 to determine a magnetization direction of the magnetic layer.

Next, a heat assisted magnetic recording method of the magnetic recording medium 1 by the magnetic recording/reproducing device will be explained. In this method, a recording operation is performed by the magnetic field modulation method. The recording method of the magnetic recording medium 1 is not limited to the magnetic field modulation method, and the information can be recorded on the magnetic recording medium 1 in the same manner when adopting the optical modulation method.

In the magnetic recording/reproducing device, firstly, a relative positioning between the laser pickup 11 and the magnetic head 12 is performed, so as to match the an area irradiated with a light beam with the magnetic field application area. The magnetic recording/reproducing device then fixes the magnetization direction of the amorphous magnetic layer 4 by the DC erase. Namely, the magnetization direction of the amorphous magnetic layer 4 is initialized.

Next, the amorphous magnetic layer 4 is heated with an application of a light beam 14 at the same time when applying thereto a magnetic field by the magnetic head 12, thereby determining the magnetization direction in each area of the amorphous magnetic layer 4 according to the information to be recorded.

As shown in FIG. 2, the light beam 14 emitted from the laser beam source in the laser pickup 11 is focused on the recording portion as desired in the amorphous magnetic layer 4 of the magnetic recording medium 1, and the recording portion irradiated with the light beam 14 is heated to the temperature at which the coercive force of the recording portion is reduced to be small enough (around 1 kOE). Then, the signal magnetic field obtained by modulating the information to be recorded is applied to the magnetic head 12 is recorded onto the recording portion. Here, the recording is performed with respect to only the portion having low coercive force (around 1 kOe). Next, the application of the light beam 14 is stopped to cool off the recording portion, thereby completing the recording operation.

Figure 6:
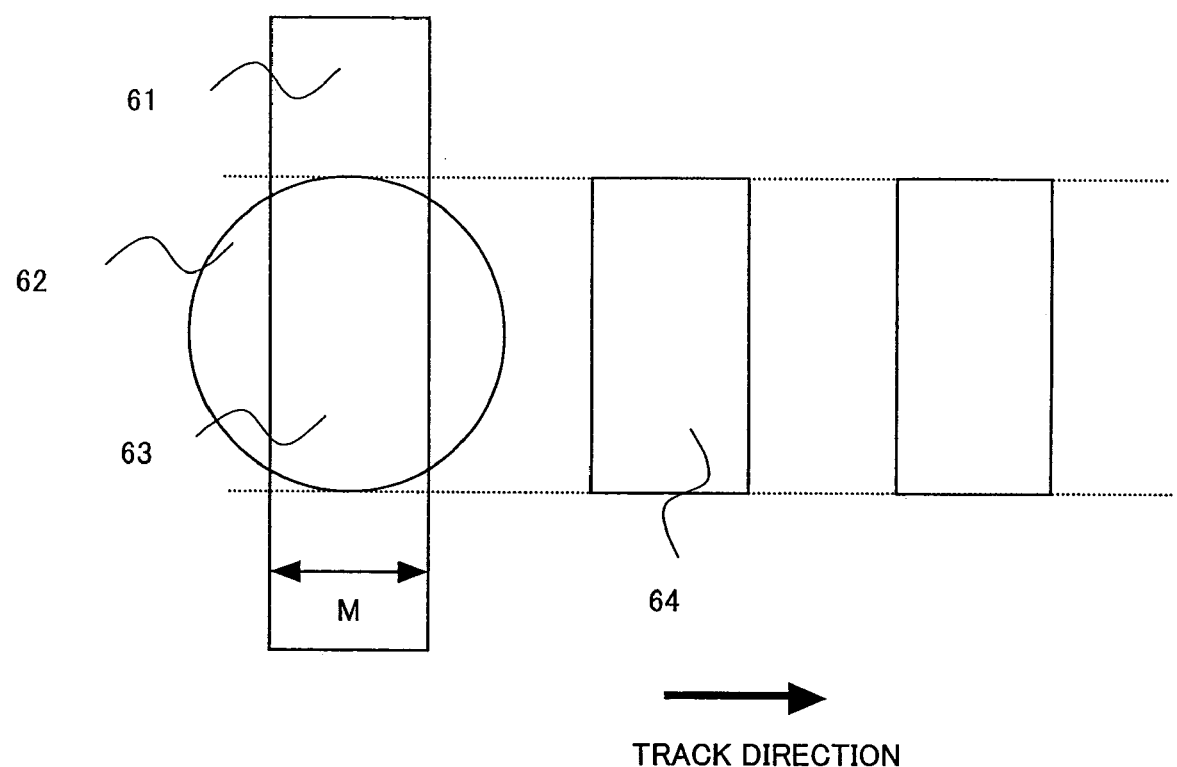
FIG. 6 is an explanatory view showing the state where recording bits are formed in the heat assisted magnetic recoding method.

As described, the overlapped area between a) the area having applied thereto the magnetic field by the magnetic head 12 and b) the heated area (corresponding to the area of the optical spot) with an application of a laser beam 62 becomes a recording area 63 where the recording bits 64 are formed, as illustrated in FIG. 6.

Incidentally, in the foregoing heat assisted magnetic recording method, the light beam (laser beam) 14 is projected onto the amorphous magnetic layer 4 from the side of the substrate 2 of the magnetic recording medium 1 through the underlayer 3. It is therefore preferable that the underlayer 3 be formed to be thin enough to allow a sufficient amount of light to pass therethrough. Specifically, it is preferable that the underlayer 3 be formed in 100 nm thickness or thinner, more preferably be formed in 10 nm thickness or thinner. On the other hand, in the case of applying the light beam 14 to the magnetic recording medium 1 from the side of the lubricating layer 6 shown in FIG. 1, the underlayer 3 having a thickness of 100 nm or thicker may be adopted.

Next, the reproducing method of the magnetic recording medium 1 using the magnetic recording/reproducing device will be explained.

In the magnetic recording/reproducing device, first, the light beam 14 is projected onto the reproducing portion of the amorphous magnetic layer 4 from the laser light source in the laser pickup 11. As a result, the temperature of the reproducing portion irradiated with the laser beam 14 is raised, and the residual magnetization in the reproducing portion is increased.

Here, it is preferable that the reproducing portion be heated to the temperature at which the residual magnetization is increased to the maximum. Here, the residual magnetization in the portion where the light beam 14 is not applied is small. This is because the portion without the laser beam 14 is not applied maintains at room temperature.

Next, a magnetic leakage flux from the reproducing portion where the residual magnetization is increased is detected by the magnetic head 12. As a result, the reproducing signal from the magnetic recording medium 1 can be obtained. Thereafter, the application of the light beam 14 onto the reproducing portion is stopped, to cool off the reproducing portion, thereby completing the reproducing operation.

In the foregoing embodiment, explanations have been given through the case of adopting the magnetic recording device for magnetically recording information onto the magnetic recording medium 1 by both a) applying a magnetic field by the magnetic head 12 and b) heating with an application of a laser beam from the laser pickup 11. However, the magnetic recording/reproducing device of the present invention is not intended to be limited to the above, and, for example, the one which performs a recording operation with respect to the magnetic recording medium 1 by applying only a magnetic field by the magnetic head 12 may be adopted.

However, in order to suppress the deterioration in signal to noise ratio (S/N ratio) due to thermal disturbance when recording at high density, it is preferable to adopt a so-called heat assisted magnetic recording method in combination of a heat application and a magnetic field application. Incidentally, the present invention is applicable to the magneto-optical recording medium and the magneto-optical recording device for reproducing signals by the magneto-optical effect.

In the following, the results of comparing the magnetic recording medium 1 in accordance with the present embodiment with a conventional recording medium will be explained.

EXAMPLE 1

A magnetic recording medium 1 (recording medium of this example (recording medium as an example of the present embodiment) will be explained.

First, on the substrate 2, an Aluminum layer (hereinafter referred to as an Al underlayer) is formed as the underlayer 3. Next, on the Al underlayer, a TbFeCo film (amorphous alloy film made of Tb, Fe and Co) is formed as the amorphous magnetic layer 4. Incidentally, in order to obtain the pinning effect in the TbFeCo film, the TbFeCo film is formed after forming the underlayer 3 on the substrate 2 as described above.

Next, on the amorphous magnetic layer (recording layer) 4, an amorphous carbon (a-C) film (C-series protective layer) generally used for hard disks is formed as the protective layer 5.

The foregoing Aluminum film, the TbFeCo film and the amorphous carbon film are formed by the DC magnetron sputtering method.

The Al underlayer is manufactured under the following conditions. Al (4N—Al) with a purity of 99.9% is used as a raw material (target), and the Al underlayer is formed in a thickness of 3.7 nm under the sputtering pressure of 0.5 Pa. The Ra on the surface of the underlayer is set to around 1.5 nm. Incidentally, in the case of adopting zinc (Zn), magnesium (Mg), argentums (Ag) etc., the Ra can be made larger as in the case of adopting Al.

The TbFeCo layer is manufactured under the following conditions. An alloy with a composition ratio of Tb:24 at % (atomic percent), Fe:52 at % and Co:24 at % is used as a sputtering target, and the TbFeCo film is formed in 50 nm thickness under the sputtering pressure of 0.45 Pa. The resulting TbFeCo film has the magnetic compensation temperature (compensation temperature) at around 50° C., and Curie temperature at around 250° C. The amorphous carbon film is formed in 10 nm thickness under the sputtering pressure of 1.0 Pa.

Lastly, as the lubricating layer 6, perfluoropolyoxy-alkane lubricant is applied onto the surface of the amorphous carbon film by the dip coater in a thickness of around 0.8 nm.

Next, as a magnetic recording medium of a comparative example (conventional magnetic recording medium) to be compared with the magnetic recording medium of the present example, a magnetic recording medium (hereinafter referred to as a comparative recording medium) without the Al underlayer (underlayer 3) is prepared.

Here, in order to accurately evaluate the effects of the average surface roughness Ra of the Al underlayer (underlayer 3) in the magneto-optical recording medium of this example, the comparative magnetic recording medium is manufactured in the same processes as the magnetic recording medium of the present example, except that the process of forming the Al underlayer is not performed. Therefore, the comparative magnetic recording medium has exactly the same structure as the magnetic recording medium of the present example except that the Al underlayer is not formed.

For the comparative magnetic recording medium without the underlayer 3, only the Ra (around 0.5 nm) of the substrate 2 is effective. Thus, the pinning effect is small.

Next, using an evaluation-use heat assisted magnetic recording/reproducing device, information recording and reproducing operations are actually performed with respect to both the magnetic recording medium of the present example and the comparative magnetic recording medium. Then, the relationships of the recording frequency characteristics which can be a measure for the high density recording are checked carefully. The shape of the recording bits thus formed are observed using the magnetic force microscope (MFM).

For the evaluation-use heat assisted magnetic recording/reproducing device, the magnetic recording/reproducing device shown in FIG. 2 is adopted. Here, for the laser pickup 11, a laser light source with oscillation wavelength of 650 nm is used, and the objective lens 15 with numerical aperture (NA) of 0.65 is used. For a magnetic head 202, a magnetic head, in combination of a GMR (Giant Magneto Resistive) and a thin film dielectric magnetic head, is adopted. The floating amount of this magnetic head 12 is set to around 28 nm. The rotation speed of the motor 13 (spindle) (rotation speed of the magnetic recording medium) is set to 3600 ($S^{-1}$). The linear velocity of the magnetic recording medium is set to 11 (m/sec).

In this evaluation experiment, the DC erasing is performed, and the heat assisted magnetic recording is then performed, which is followed by the heat assisted reproducing, and the recording and reproducing characteristics are measured. The heat assisted magnetic recording was performed under the following conditions. An output of the laser light source is set to 5 mW, and a magnetic field current of the magnetic head 12 is set to 10 mA. The heat assisted reproducing is performed under the following conditions. An output of a laser light source is set to 2 mW, and the bias current of the GMR element is set to 5 mA.

In this evaluation experiment, as an index for higher density recording of the magnetic recording medium, changes in signal quality with changes in recording frequency characteristics, i.e., changes in magnetic field application frequency (recording frequency) are obtained. Specifically, a carrier wave signal level (C value) and a noise level (N value) with changes in recording frequency are measured, and its ratio, i.e., carrier wave to noise ratio (C/N value) is obtained as a parameter for the evaluation of a signal quality of the recording bits. The results of the experiment (recording frequency characteristic) are shown in FIG. 3.

Figure 3:
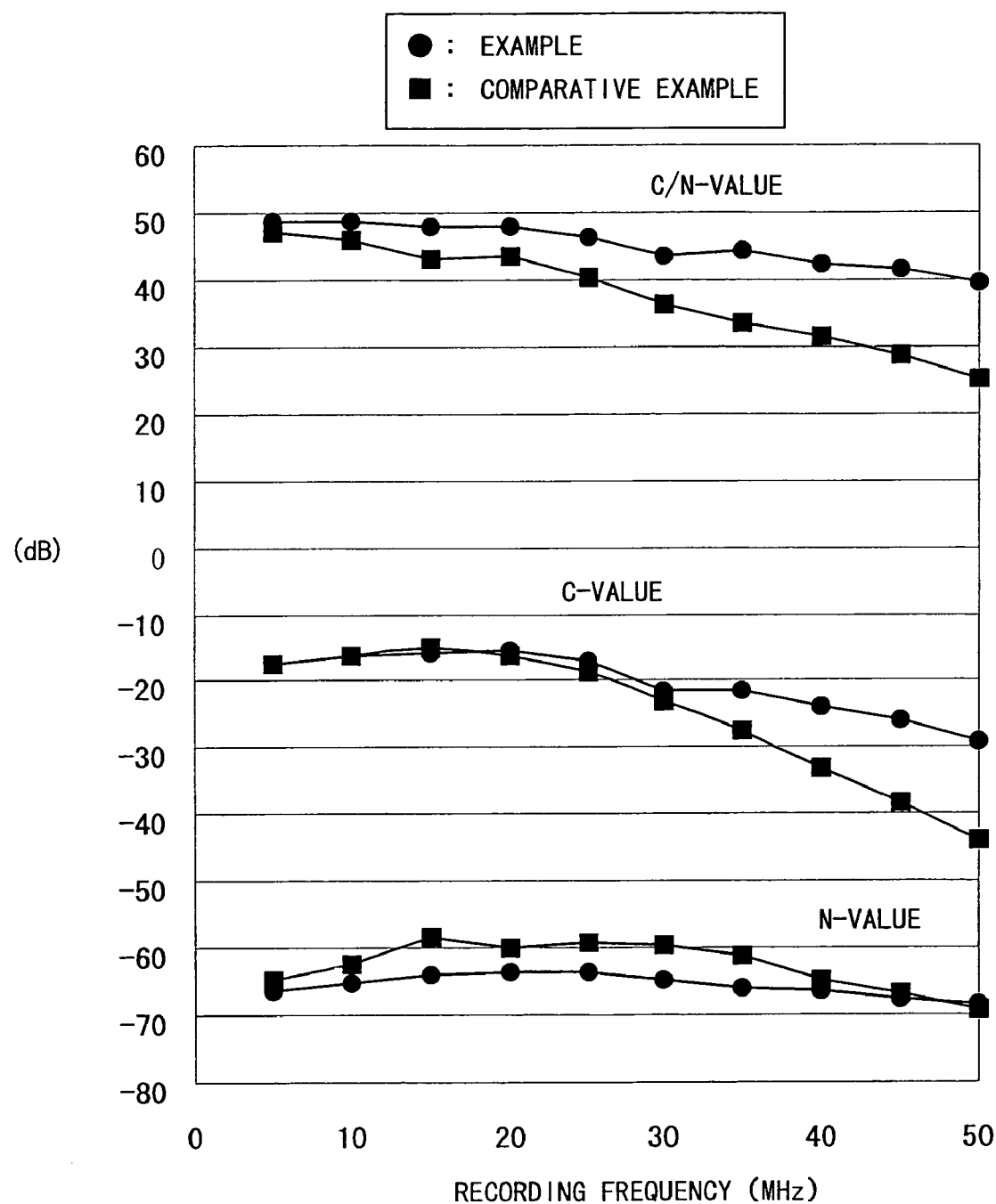
FIG. 3 is a graph showing recording frequency characteristics of a magnetic recording medium as an example and a magnetic recording medium as a comparative example in accordance with one embodiment of the present invention.

In FIG. 3, the plots denoted by show the results of measurements of the recording frequency characteristics of the magnetic recording medium of the present example wherein protrusions and recessions are formed on the surface of the underlayer 3 by adopting Al underlayer for the underlayer 3, to increase the average surface roughness Ra.

In FIG. 3, the plots denoted by ■ show the results of measurements of the recording frequency characteristics of the magnetic recording medium of the comparative example, without the underlayer, and therefore with a small average surface roughness Ra without having fine protrusions and recessions formed on the surface of the disk surface.

For the magnetic recording medium of the present embodiment, the tilt indicating a drop in C/N value is not increased rapidly throughout the range of the recording frequency of 5 MHz to 50 MHz, and the C/N value of not less than around 40 dB can be maintained throughout the range. Form this evaluation experiment, it is therefore found that the magnetic recording medium of the present example offers desirable recording frequency characteristics.

With respect to the magnetic recording medium of this example, a magnetic image is also observed by the magnetic force microscope. As a result, such undesirable phenomenon of a track width being reduced or a track being interrupted is not observed throughout the range of the recording frequency of 5 MHz to 100 MHz. Form this observation, it is therefore found that the magnetic recording medium of the present example offers desirable recording frequency characteristics.

On the other hand, for the comparative magnetic recording medium, C value is reduced sharply when the recording frequency is increased to 25 MHz, and the C/N value is maintained at around 40 dB or above only in the recording frequency range of 5 Hz to 25 MHz.

Furthermore, as a result of observation of a magnetic image with respect to the comparative magnetic recording medium, such undesirable phenomenon of a track width being reduced or a track being interrupted appears when the recording frequency is increased to 25 MHz or above. This indicates that when the recording frequency is increased to be any higher than 25 MHz, the recording bits cannot be maintained under stable conditions, resulting in a deterioration of signal quality.

Although not shown, similar results of evaluation measurements to those indicated by the plots ■ are obtained when adopting aluminum nitride (AlN) as a material for the underlayer 3.

As to the recording current of the magnetic head 12, a recording operation is performed with respect to the magnetic recording medium of present example, including the Al underlayer with varying recording current in a range of 1 mA to 50 mA. As a result, it is found that a recording operation can be performed under stable conditions even without being affected by changes in recording current of 1 mA to 50 mA (recording current margin is found to be 50 mA or higher). In contrast, for the comparative magnetic recording medium without the underlayer, the recording current is limited to 1 mA to 10 mA (recording current margin is found to be 10 mA or lower), and when the recording current is increased to be any higher than 10 mA, the C/N is reduced gradually, and a recording operation is difficult to be performed.

As described, according to the magnetic recording medium of this example, by adopting the Al underlayer (the underlayer having formed thereon protrusions and recessions with a larger Ra), improved performances of the magnetic recording medium are obtained as compared to a conventional magnetic recording medium.

It is therefore found that by adopting the Al underlayer, a larger Ra (average surface roughness) can be achieved with ease, and with the larger Ra, the recording bits can be formed under stable condition even when recording at high density.

For the magnetic recording medium 1 adopting the Al underlayer as the underlayer 3, eight magnetic recording media 1 are prepared by varying thickness by 1.0 nm or 2.0 nm in the range of 1.0 nm to 10.0 nm, and the performances of the respective magnetic recording media 1 are evaluated.

The evaluation results show that C/N is improved significantly for the magnetic recording media 1 adopting the Al underlayer with a thickness in a range of 2.0 nm to 6.0 nm. The Ra of the Al underlayer in these magnetic recording media 1 increases as the layer becomes thicker. Here, the Al layer thickness range of 2.0 nm to 6.0 nm corresponds to the Ra range of 1.0 nm to 1.7 nm respectively.

Figure 4:
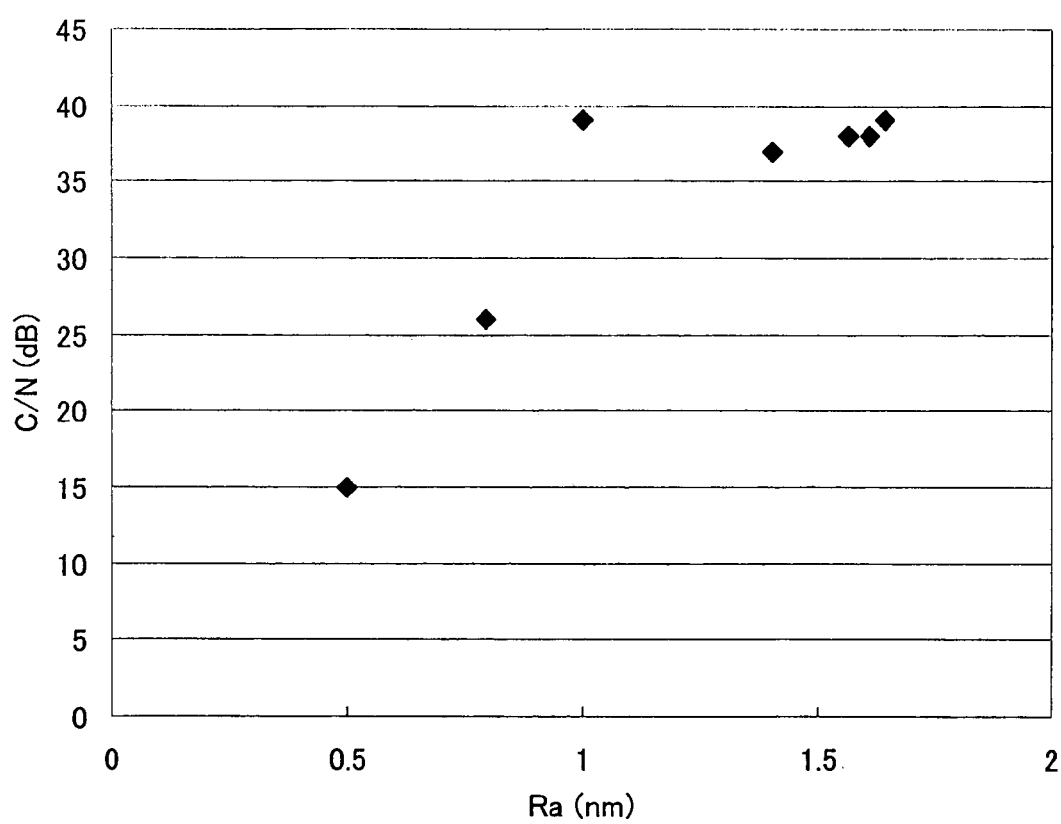
FIG. 4 is a graph showing the relationship between Ra values and C/N values of the magnetic recording medium as an example and the magnetic recording medium as a comparative example in accordance with one embodiment of the present invention.

FIG. 4 shows the relationship between Ra and the C/N value with respect to a) a magnetic recording medium without adopting the underlayer 3 (medium with a small Ra) and b) the magnetic recording medium 1 adopting the Al underlayer with a thickness in a range of 1.0 nm to 6.0 nm (medium adopting a thick underlayer 3). For the magnetic recording medium without adopting the underlayer 3, Ra on the surface of the substrate 2 is measured.

In FIG. 4, Ra values are plotted in the x-axis, and C/N values when carrying out heat assisted recording/reproducing with a recording frequency of 45 MHz are plotted in the y-axis. In the heat assisted recording, the recording current is fixed at 30 mA.

As can be seen from the graph of FIG. 4, in the Ra range of not more than 1.0 nm, a C/N value increases as Ra increases, and in the Ra range of not less than 1.0 and not more than 1.7 nm, a C/N value is maintained high and substantially constant. Although not shown, in the case of adopting the Al underlayer with a thickness of not less than 10 nm, an Ra value is still increased; however, the diameter of the protrusions and recessions becomes too large. Therefore, the pinning effect cannot be fully appreciated for small magnetic bits (magnetic bits at high density recording), and the larger Ra is therefore not effective for the improvement in the C/N.

As a result of the foregoing experiment, it is found that a recording density can be improved in the Ra range of 1.0 nm to 1.7 nm. Here, in consideration of measurement error of not less than 0.3 nm, it is preferable that Ra be set in a range of 0.7 nm to 2.0 nm.

As to the purity of an Al raw material used in the Al underlayer, when adopting 4N—Al (purity of 99.99%), the recording density is improved significantly as compared to the recording medium without the underlayer. Similarly, significant improvements in recording density are achieved also when adopting 5N (99.999%)-Al, and 6N (99.9999%). As to the lower limit, Al with the purity of 3N or above is sufficient.

To realize a high density recording medium having the pining effect by increasing the Ra (average surface roughness) of the Al underlayer, it is therefore effect to adopt an Al raw material with purity 3N or higher.

EXAMPLE 2

The following experiments are conducted to confirm the effects of the protrusions and recessions on the surface of the recording medium when carrying out recording and reproducing operations in the generally used magnetic recording/reproducing method which is performed at room temperature without being heat assisted.

A sample recording magnetic recording medium adopted in this example is manufactured to have the same structure as that of the example 1 by the same method, and the sample recording magnetic recording medium of this example is basically the same as that of the example 1. Namely, the magnetic recording medium of this sample is made up of the substrate 2, the underlayer 3 made of Al (4N—Al) with purity of 99.99%, the amorphous magnetic layer (recording layer) 4 made of TbFeCo, and the protective layer 5 made of carbon and the lubricant layer 6.

However, the magnetic recording medium of the this example differs from the magnetic recording medium of the example 1 in that an amount of Tb in the amorphous magnetic layer 4 is adjusted so that recording and reproducing operations can be carried out at room temperature. Namely, in the magnetic recording medium of this example, the amount of Tb in the amorphous magnetic layer 4 is increased to reduce the coercive force at room temperature and also to increase the magnetization at room temperature, thereby permitting recording/reproducing at room temperature.

In this example, as a magnetic recording medium in accordance with the embodiment, a magnetic recording medium of an example adopting the underlayer 3 (Al underlayer with a thickness of 2 nm), and as a comparative example, a magnetic recording medium without the underlayer 3 are manufactured. Then, recording and reproducing operations are performed with respect to both the magnetic recording medium of the present example and the comparative magnetic recording medium, to evaluate recording and reproducing characteristics of these recording media. In this example, recording and reproducing operations on and from the magnetic recording medium are performed using only the magnetic head 12 without applying a laser beam (without heat assisted) as in recording with respect to the generally used magnetic recording medium. The evaluation results of the recording and reproducing performances are shown in FIG. 5.

Figure 5:
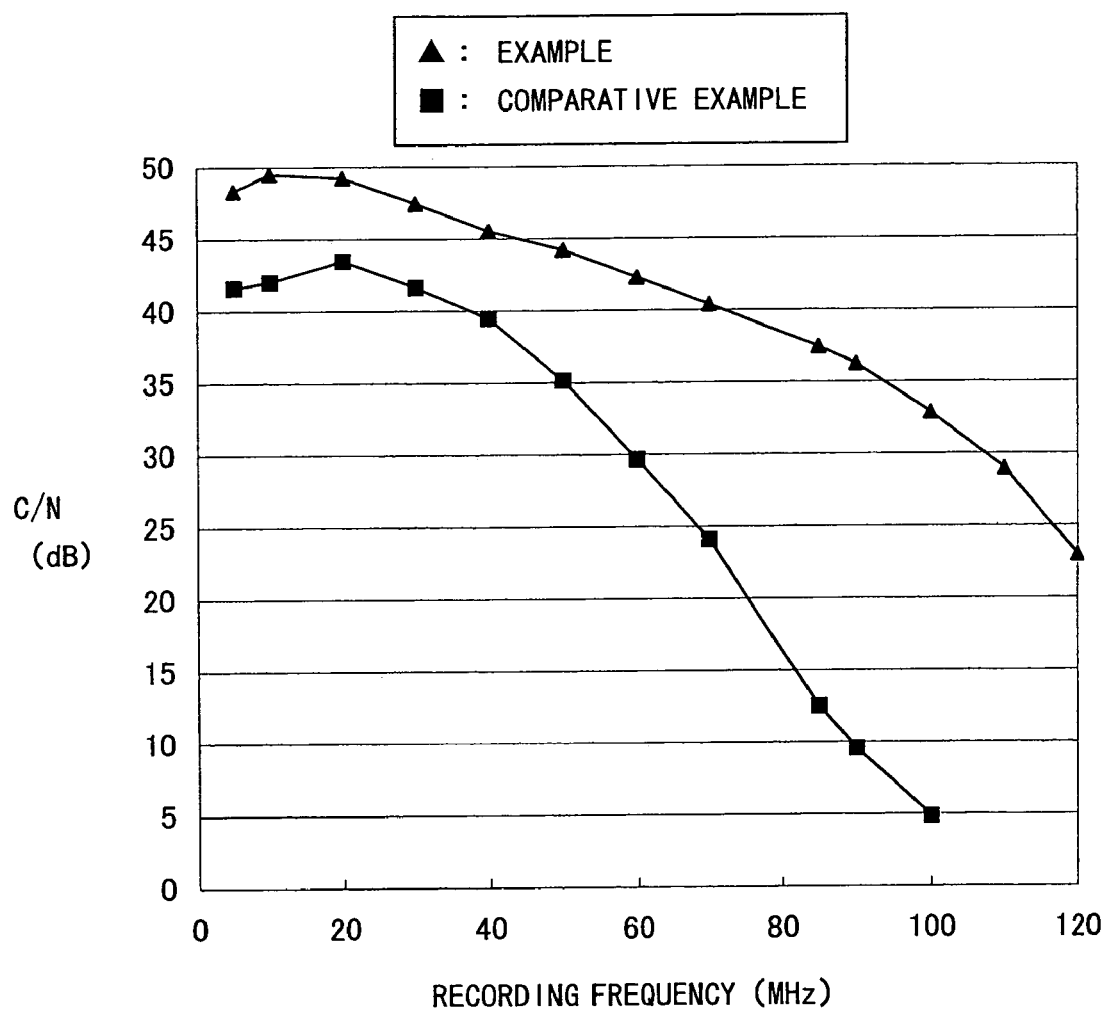
FIG. 5 is a graph showing recording frequency characteristics of a magnetic recording medium of an example and a magnetic recording medium of a comparative example in the case of recording using the magnetic head only in accordance with another example of the present invention.

In FIG. 5, the plots denoted by ▲ show the results of measurements of the recording frequency characteristic of the magnetic recording medium of this example wherein protrusions and recessions are formed on the surface of the underlayer 3 by adopting the Al underlayer as the underlayer 3, to increase the average surface roughness Ra. Similarly, the plots denoted by ■ show the results of measurements of the recording frequency characteristics of the comparative magnetic recording medium, without the underlayer, and which has a small average surface roughness (Ra) without having fine protrusions and recessions formed on the surface of the disk surface.

As can be seen from FIG. 5, as compared to the comparative magnetic recording medium without the underlayer 3 (results plotted by ■), the magnetic recording medium having protrusions and recessions on the surface of the underlayer 3 shows significant improvements in frequency characteristic (results plotted by ▲). The experiment therefore confirms that the magnetic recording medium of the present embodiment permits high-density recording.

With the C/N value of not less than 30 dB, the recording frequency of the magnetic recording medium of the comparative example is not more than 60 MHz, whereas, the recording frequency of above 100 MHz is obtained for the recording medium of the present embodiment. Incidentally, when recording at room temperature, the track width cannot be reduced as in the case of carrying out the heat assisted recording operation In the case of the magnetic recording medium without being heat assisted, in the case where the protrusions and recessions or Ra on the surface of the underlayer 3 become too large by adopting the thick underlayer 3, the magnetic characteristic shows in-plane anisotropy, which in turn causes the problem of thermal disturbance. For this reason, it is found that the magnetic recording medium adopting the thick underlayer 3 is not suited for high-density recording. Therefore, in the generally used magnetic recording without being heat assisted, it is found that a high density recording can be performed when adopting the Al underlayer with a thickness of 1 nm to 3 nm. Here, the Al layer thickness range of 1 nm to 3 nm corresponds to the Ra range of the underlayer 3 of 0.7 nm to 1.5 nm respectively.

As described, the magnetic recording medium may adopt the non-magnetic metal-element layer made of a material of at least one element selected from the group consisting of aluminum (Al), zinc (Zn), magnesium (Mg) and argentums (Ag).

According to the foregoing structure, by adopting a material of any of the above elements for the non-magnetic metal element layer, it is possible to appropriately form the protrusions and recessions with an average surface roughness Ra in a range of 0.7 nm to 2.0 nm on the surface of the non-magnetic metal element layer when crystallizing the material with ease.

The magnetic recording medium may be arranged such that protrusions and recessions with the average surface roughness Ra in the above range are formed on the surface of the non-magnetic metal-element layer, and these protrusions and recessions are formed by a crystallization of the material of the non-magnetic metal-element layer.

According to the foregoing structure, the protrusions and recessions with an average surface roughness Ra in a range of 0.7 nm to 2.0 nm can be formed when forming the non-magnetic metal-element layer at the same time. Therefore, in the post process after forming the non-magnetic metal element layer, the process for adjusting the average surface roughness Ra to fall in the above range can be omitted.

The magnetic recording medium of the foregoing structure may be arranged such that the non-magnetic metal-element layer is made of a material with purity of not less than 3N (99.9%).

According to the foregoing structure adopting the non-magnetic metal-element layer made of a material with purity of not less than 3N (99.9%), the crystallization of the non-magnetic metal element layer can be expedited appropriately, and the average surface roughness Ra in a range of 0.7 nm and 2.0 nm on the surface of the non-magnetic element layer can be surely achieved.

Another magnetic recording medium of the present invention is characterized by including a substrate, an amorphous magnetic layer which serves as a recording layer formed on the substrate, and a non-magnetic metal-element layer formed between the substrate and the amorphous magnetic layer, wherein the non-magnetic metal-element layer is made of a material of a single element with purity of not less than 3N (99.9%).

According to the foregoing structure adopting the non-magnetic metal-element layer made of a material with purity of not less than 3N (99.9%), the crystallization of the non-magnetic metal element layer can be expedited appropriately, and the average surface roughness Ra on the surface of the non-magnetic element layer can increased appropriately. As a result, the non-magnetic metal-element layer offers a large pinning effect with respect to the amorphous magnetic layer formed thereon. In the amorphous magnetic layer, by utilizing the pinning effect, the magnetic bits can be formed under stable conditions even when carrying out a high density recording.

Further, the non-magnetic metal element layer which serves as an underlayer of the amorphous magnetic layer is made of non-magnetic metal. Therefore, the problem associated with the conventional structure adopting the underlayer made of magnetic metal (second prior art technique), i.e., a magnetic material is deposited with a rise in temperature can be prevented.

The magnetic recording medium may be arranged such that information is recorded on the amorphous magnetic layer by applying heat and a magnetic field onto the amorphous magnetic layer.

According to the foregoing structure adopting the heat assisted recording method, it is possible to record on the amorphous magnetic layer at high density by forming still finer magnetic bits, and to suppress deteriorations in signal to noise ratio (S/N ratio) due to thermal disturbance when recording at high density.

Here, it is important to form the magnetic bits under stable condition in the amorphous magnetic layer utilizing the pinning effect, particularly when magnetically recording information on the amorphous magnetic layer by applying thereto heat and magnetic field for the reasons set forth below.

When magnetically recording information with an application of heat and a magnetic field, a recording area is heated, the coercivity is reduced, and magnetic anisotropy is also reduced significantly in the magnetic layer. It is therefore important to suppress the magnetic wall movement. Therefore, by arranging the foregoing magnetic recording medium so as to form magnetic bits in the amorphous magnetic layer under stable condition, the effects of improving signal quality when recording at high density can be more appreciated.

The magnetic recording device of the present invention for magnetically recording with respect to the foregoing magnetic recording medium is characterized by including magnetic field application means (see magnetic head 12 in FIG. 2) for applying a magnetic field onto the magnetic layer to determine the magnetic direction, wherein information is magnetically recorded on the magnetic layer.

According to the foregoing structure adopting the magnetic recording medium which permits recording bits to be formed under stable conditions even when carrying out high density recording, it is possible to perform a high density recording with sufficient signal quality.

Furthermore, as compared to the conventional technique, a larger margin can be ensured for the recording current value. Namely, a wider range for a recordable current value can be ensured. As a result, a magnetic head for the magnetic recording device can be designed with ease. This larger margin also brings about the effect of stronger tolerance against fluctuations in current, thereby improving the reliability of the magnetic recording device.

The magnetic recording device of the present invention adopting the foregoing magnetic recording medium is characterized by including:

heating means (laser pickup 11, see FIG. 2) for locally heating the magnetic layer, and magnetic field application means for applying a magnetic field onto at least a part of the heated area of the magnetic layer as heated by the heating means (laser pickup 11) to determine a magnetization direction, wherein information is magnetically recorded onto the magnetic layer.

According to the foregoing structure adopting the magnetic recording medium which permits recording bits to be formed under stable condition even when carrying out high density recording, it is possible to perform a high density recording with sufficient signal quality.

According to the foregoing structure, by adopting a so-called heat assisted magnetic recording method wherein the amorphous magnetic layer is locally heated, and a magnetic field is applied at least a part of the heated area of the amorphous magnetic layer, the recording area is limited to the area where the light beam application area and the magnetic field application area are overlapped. As a result, a recording track width can be reduced, thereby carrying out a high density recording.

According to the foregoing heat assisted magnetic recording method, the recording area (recording bits) are heated when recording, and the coercivity is therefore reduced, and the magnetic anisotropy is also reduced significantly. Therefore, in the heat assisted magnetic recording method, a movement in magnetic wall is liable to occur, and it is more important to suppress the magnetic wall movement in the amorphous magnetic layer by the surface roughness Ra (protrusions and recessions) of the non-magnetic metal element layer. As a result, in the heat assisted magnetic recording, the effects of improving a signal quality when recording at high density can be more appreciated.

Furthermore, as compared to the conventional technique, a larger margin can be ensured for the recording current value. Namely, a wider range for a recordable current value can be ensured. As a result, a magnetic head for the magnetic recording device can be designed with ease. This larger margin also brings about the effect of stronger tolerance against fluctuations in current, thereby improving the reliability of the magnetic recording device.

The method of manufacturing a magnetic recording medium of the present invention is characterized by including the steps of:

forming a non-magnetic metal element layer made of a material of a single element with purity of not less than 3N (99.9%) on a substrate; and forming an amorphous magnetic layer as a recording layer on the non-magnetic metal element layer.

According to the foregoing method, by adopting a material with high purity 3N (99.9%) for the non-magnetic metal element layer, a large Ra can be obtained even when forming the non-magnetic metal element layer thin. As a result, the foregoing structure having the non-magnetic metal element layer of a large average surface roughness Ra brings about a great pinning effect onto the amorphous magnetic layer, thereby forming magnetic bits under stable condition when carrying out a high density recording.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium, comprising:

a substrate;

an amorphous magnetic layer formed on said substrate, said amorphous magnetic layer serving as a recording layer; and a non-magnetic metal-element layer formed between said substrate and said amorphous magnetic layer, wherein an average surface roughness Ra of said non-magnetic metal-element layer is in a range of 0.7 nm to 2.0 nm, and wherein said non-magnetic metal-element layer is made of a material of at least one element selected from the group consisting of aluminum (Al), zinc (Zn), magnesium (Mg) and argentums (Ag).

2. The magnetic recording medium as set forth in claim 1, wherein:

protrusions and recessions with said average surface roughness Ra are formed on a surface of said non-magnetic metal-element layer, said protrusions and recessions being formed by a crystallization of the material of said non-magnetic metal-element layer.

3. The magnetic recording medium as set forth in claim 1, wherein:

said non-magnetic metal-element layer is made of a material with purity of not less than 3N (99.9%).

4. The magnetic recording medium as set forth in claim 1, wherein:

information is recorded on said amorphous magnetic layer by applying heat and a magnetic field onto said amorphous magnetic layer.

5. The magnetic recording medium as set forth in claim 1, wherein:
said recording layer is made of an amorphous alloy of Tb, Fe and Co.

6. A magnetic recording medium, comprising:
a substrate;
an amorphous magnetic layer formed on said substrate, said amorphous magnetic layer serving as a recording layer; and
a non-magnetic metal-element layer formed between said substrate and said amorphous magnetic layer,
wherein an average surface roughness Ra of said non-magnetic metal-element layer is in a range of 0.7 nm to 2.0 nm, and, wherein:
said non-magnetic metal-element layer is made of Al, and has a thickness in a range of 2.0 nm to 6.0 nm.

7. The magnetic recording medium as set forth in claim 1, wherein:
an amorphous magnetic material used in said recording layer is a magnetic material that permits heat assisted recording.

8. The magnetic recording medium as set forth in claim 7, wherein:
said magnetic material is made of a ferrimagnetic material having compensation temperature at around room temperature.

9. The magnetic recording medium as set forth in claim 7, wherein:
said magnetic material is made of an amorphous rare earth-transition metal alloy.

10. The magnetic recording medium as set forth in claim 1, wherein:
said recording layer is an amorphous magnetic layer that permits heat assisted recording; and
said non-magnetic metal-element layer has a thickness in a range of 1.0 nm to 100 nm.

11. The magnetic recording medium as set forth in claim 10, wherein:
said non-magnetic metal-element layer has a thickness in a range of 1.0 nm to 10 nm.

12. A magnetic recording medium, comprising:
a substrate;
an amorphous magnetic layer formed on said substrate, said amorphous magnetic layer serving as a recording layer; and
a non-magnetic metal-element layer formed between said substrate and said amorphous magnetic layer,
wherein an average surface roughness Ra of said non-magnetic metal-element layer is in a range of 0.7 nm to 2.0 nm, wherein:
said recording layer is an amorphous magnetic layer which permits information to be recorded without being heat assisted; and
said non-magnetic metal element layer is made of Al, and has a thickness in a range of 1.0 nm to 3.0 nm.

13. The magnetic recording medium as set forth in claim 1, wherein said non-magnetic metal-element layer is made of a material of a single element with purity of not less than 3N (99.9%).

14. The magnetic recording medium as set forth in claim 9, wherein:
information is recorded on said amorphous magnetic layer by applying heat and a magnetic field onto said amorphous magnetic layer.

15. A magnetic recording device for magnetically recording information on a magnetic recording medium which includes a substrate, an amorphous magnetic layer formed on said substrate, said amorphous magnetic layer serving as a recording layer, and a non-magnetic metal-element layer formed between said substrate and said amorphous magnetic layer, wherein an average surface roughness Ra of said non-magnetic metal element layer is in a range of 0.7 nm to 2.0 nm,
said magnetic recording device, comprising:
magnetic field application means for applying a magnetic field onto said magnetic layer to determine a magnetization direction,
wherein information is magnetically recorded onto said magnetic layer using said magnetic field application means, and
wherein said non-magnetic metal-element layer is made of a material of at least one element selected from the group consisting of aluminum (Al), zinc (Zn), magnesium (Mg) and argentums (Ag).

16. A magnetic recording device for magnetically recording information on a magnetic recording medium which includes a substrate, an amorphous magnetic layer formed on said substrate, said amorphous magnetic layer serving as a recording layer, and a non-magnetic metal-element layer formed between said substrate and said amorphous magnetic layer, wherein an average surface roughness Ra of said non-magnetic metal-element layer is in a range of 0.7 nm to 2.0 nm,
said magnetic recording device, comprising:
heating means for locally heating said magnetic layer; and
magnetic field application means for applying a magnetic field onto at least a portion of a heated area of said magnetic layer as heated by said heating means to determine a magnetization direction,
wherein information is magnetically recorded onto said magnetic layer using said heating means and said magnetic field application means, and
wherein said non-magnetic metal-element layer is made of a material of at least one element selected from the group consisting of aluminum (Al), zinc (Zn), magnesium (Mg) and argentums (Ag).

17. The magnetic recording device as set forth in claim 16, wherein:
said heating means includes an optical head for projecting a light beam to form a light spot in a part of a magnetic field application area formed on said magnetic layer by said magnetic field application means.

18. A magnetic recording device for magnetically recording information on a magnetic recording medium which includes a substrate, an amorphous magnetic layer formed on said substrate, said amorphous magnetic layer serving as a recording layer, and a non-magnetic metal-element layer formed between said substrate and said amorphous magnetic layer, wherein an average surface roughness Ra of said non-magnetic metal element layer is in a range of 0.7 nm to 2.0 nm,
said magnetic recording device, comprising:
an optical head for locally heating said magnetic layer; and
a magnetic head for applying a magnetic field onto at least a portion of a heated area of said magnetic layer as heated by said heating head to determine a magnetization direction,
wherein information is magnetically recorded onto said magnetic layer using said optical head and said magnetic head, and
wherein said non-magnetic metal-element layer is made of a material of at least one element selected from the group consisting of aluminum (Al), zinc (Zn), magnesium (Mg) and argentums (Ag).

19. A magnetic recording device for magnetically recording information on a magnetic recording medium which includes a substrate, an amorphous magnetic layer formed on said substrate, said amorphous magnetic layer serving as a recording layer, and a non-magnetic metal-element layer formed between said substrate and said amorphous magnetic layer, wherein an average surface roughness Ra of said non-magnetic metal element layer is in a range of 0.7 nm to 2.0 nm, said magnetic recording device, comprising:
magnetic field application means for applying a magnetic field onto said magnetic layer to determine a magnetization direction,
wherein information is magnetically recorded onto said magnetic layer using said magnetic field application means, and
wherein said non-magnetic metal-element layer is made of Al, and has a thickness in a range of 2.0 nm to 6.0 nm.

20. A magnetic recording device for magnetically recording information on a magnetic recording medium which includes a substrate, an amorphous magnetic layer formed on said substrate, said amorphous magnetic layer serving as a recording layer, and a non-magnetic metal-element layer formed between said substrate and said amorphous magnetic layer, wherein an average surface roughness Ra of said non-magnetic metal-element layer is in a range of 0.7 nm to 2.0 nm, said magnetic recording device, comprising:
heating means for locally heating said magnetic layer; and
magnetic field application means for applying a magnetic field onto at least a portion of a heated area of said magnetic layer as heated by said heating means to determine a magnetization direction,
wherein information is magnetically recorded onto said magnetic layer using said heating means and said magnetic field application means, and
wherein said non-magnetic metal-element layer is made of Al, and has a thickness in a range of 2.0 nm to 6.0 nm.

21. A magnetic recording device for magnetically recording information on a magnetic recording medium which includes a substrate, an amorphous magnetic layer formed on said substrate, said amorphous magnetic layer serving as a recording layer, and a non-magnetic metal-element layer formed between said substrate and said amorphous magnetic layer, wherein an average surface roughness Ra of said non-magnetic metal element layer is in a range of 0.7 nm to 2.0 nm, said magnetic recording device, comprising:
an optical head for locally heating said magnetic layer; and
a magnetic head for applying a magnetic field onto at least a portion of a heated area of said magnetic layer as heated by said heating head to determine a magnetization direction,
wherein information is magnetically recorded onto said magnetic layer using said optical head and said magnetic head, and
wherein said non-magnetic metal-element layer is made of Al, and has a thickness in a range of 2.0 nm to 6.0 nm.

22. The magnetic recording device as set forth in claim 20, wherein:
said heating means includes an optical head for projecting a light beam to form a light spot in a part of a magnetic field application area formed on said magnetic layer by said magnetic field application means.

23. A magnetic recording device for magnetically recording information on a magnetic recording medium which includes a substrate, an amorphous magnetic layer formed on said substrate, said amorphous magnetic layer serving as a recording layer, and a non-magnetic metal-element layer formed between said substrate and said amorphous magnetic layer, wherein an average surface roughness Ra of said non-magnetic metal element layer is in a range of 0.7 nm to 2.0 nm, said magnetic recording device, comprising:
magnetic field application means for applying a magnetic field onto said magnetic layer to determine a magnetization direction,
wherein information is magnetically recorded onto said magnetic layer using said magnetic field application means, and
wherein said recording layer is an amorphous magnetic layer which permits information to be recorded without being heat assisted; and
said non-magnetic metal element layer is made of Al, and has a thickness in a range of 1.0 nm to 3.0 nm.

24. A magnetic recording device for magnetically recording information on a magnetic recording medium which includes a substrate, an amorphous magnetic layer formed on said substrate, said amorphous magnetic layer serving as a recording layer, and a non-magnetic metal-element layer formed between said substrate and said amorphous magnetic layer, wherein an average surface roughness Ra of said non-magnetic metal-element layer is in a range of 0.7 nm to 2.0 nm, said magnetic recording device, comprising:
heating means for locally heating said magnetic layer; and
magnetic field application means for applying a magnetic field onto at least a portion of a heated area of said magnetic layer as heated by said heating means to determine a magnetization direction,
wherein information is magnetically recorded onto said magnetic layer using said heating means and said magnetic field application means, and
wherein said recording layer is an amorphous magnetic layer which permits information to be recorded without being heat assisted; and
said non-magnetic metal element layer is made of Al, and has a thickness in a range of 1.0 nm to 3.0 nm.

25. A magnetic recording device for magnetically recording information on a magnetic recording medium which includes a substrate, an amorphous magnetic layer formed on said substrate, said amorphous magnetic layer serving as a recording layer, and a non-magnetic metal-element layer formed between said substrate and said amorphous magnetic layer, wherein an average surface roughness Ra of said non-magnetic metal element layer is in a range of 0.7 nm to 2.0 nm, said magnetic recording device, comprising:
an optical head for locally heating said magnetic layer; and
a magnetic head for applying a magnetic field onto at least a portion of a heated area of said magnetic layer as heated by said heating head to determine a magnetization direction,
wherein information is magnetically recorded onto said magnetic layer using said optical head and said magnetic head, and wherein said recording layer is an amorphous magnetic layer which permits information to be recorded without being heat assisted; and said non-magnetic metal element layer is made of Al, and has a thickness in a range of 1.0 nm to 3.0 nm.

26. The magnetic recording device as set forth in claim 24, wherein:

said heating means includes an optical head for projecting a light beam to form a light spot in a part of a magnetic field application area formed on said magnetic layer by said magnetic field application means.

* * * * *